| United States Patent [19] | [11] | 4,101,629 |
|---|---|---|
| Mercier et al. | [45] | Jul. 18, 1978 |

[54] PURIFICATION OF SOLUTIONS CIRCULATING IN THE BAYER CYCLE

[75] Inventors: Henri Mercier; Robert Magrone, both of Gardanne; Jean Deabriges, Aix-en-Provence, all of France

[73] Assignee: Aluminium Pechiney, Lyon, France

[21] Appl. No.: 734,188

[22] Filed: Oct. 20, 1976

[30] Foreign Application Priority Data

Oct. 21, 1975 [FR] France .................................. 75 32169

[51] Int. Cl.$^2$ .............................................. C01F 7/06
[52] U.S. Cl. .................................... 423/121; 423/127; 423/129; 423/130; 423/122
[58] Field of Search ............... 423/121, 127, 130, 122, 423/129

[56] References Cited

FOREIGN PATENT DOCUMENTS

| 400,984 | 11/1933 | United Kingdom ................. 423/121 |
| 404,028 | 1/1934 | United Kingdom ................. 423/121 |
| 745,601 | 2/1956 | United Kingdom ................. 423/121 |
| 1,039,985 | 8/1966 | United Kingdom ................. 423/121 |

*Primary Examiner*—Herbert T. Carter
*Attorney, Agent, or Firm*—Dennison, Dennison, Meserole & Pollack

[57] ABSTRACT

Process for treating solutions from the Bayer process, enabling amounts of sodium carbonate and sodium oxalate or sodium salts of organic acids corresponding to the amounts of these compounds dissolved during the attack on a bauxite to be removed by means of a barium compound, and without consumption of the latter.

3 Claims, 1 Drawing Figure

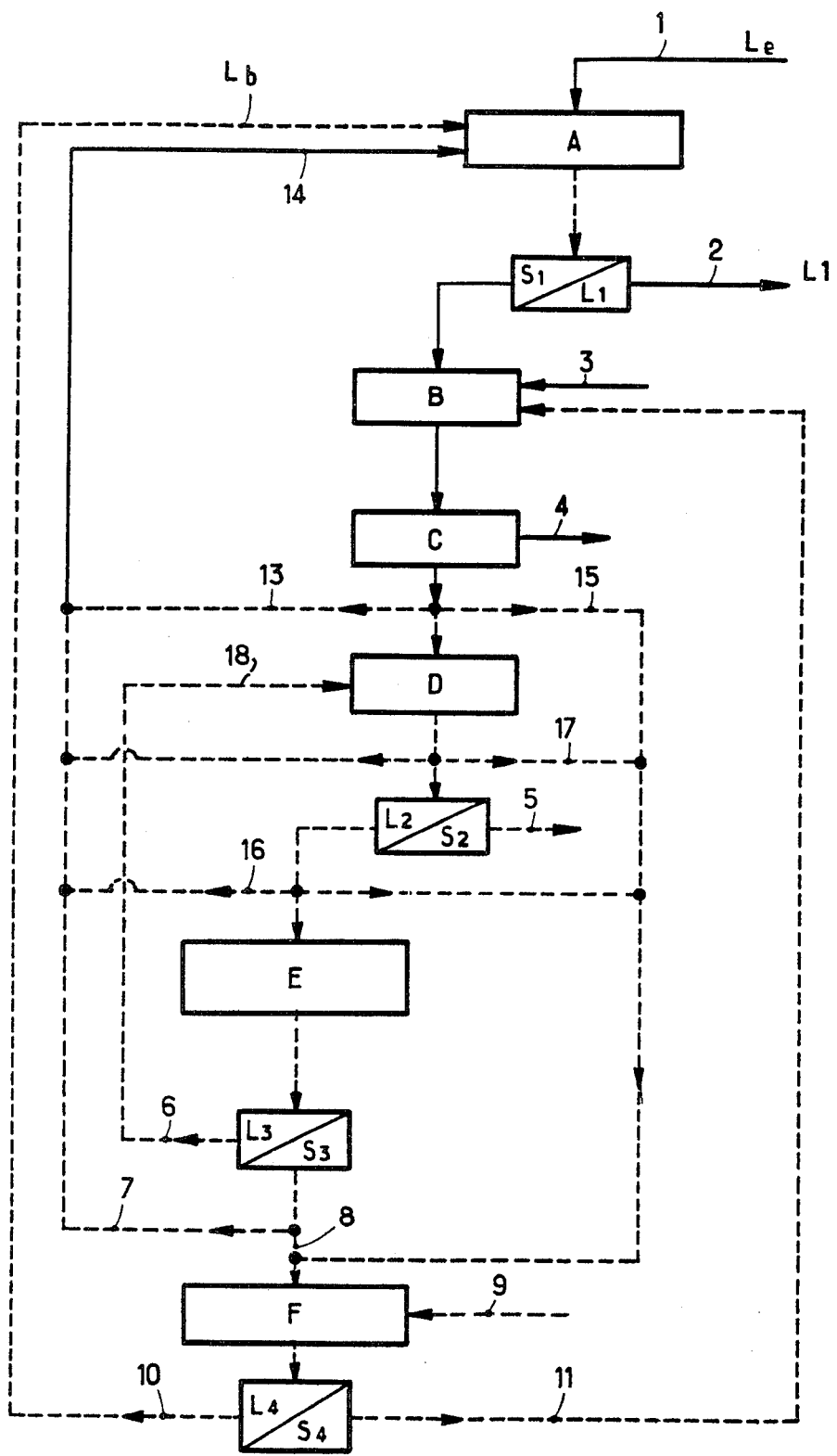

PURIFICATION OF SOLUTIONS CIRCULATING IN THE BAYER CYCLE

The present invention concerns the purification of solutions circulating in the Bayer cycle for the alkali treatment of bauxites (Bayer process).

As is known, in this process of bauxite is attacked with a more or less concentrated sodium hydroxide solution derived in part from an addition of industrial quality hydroxide and in part from the recycling of an alkaline solution of sodium aluminate. At the same time as the alumina is dissolved to form sodium aluminate, other elements such as phosphorous, vanadium and sulfur which may be contained in small amounts in the bauxite, dissolve in the form of sodium salts. When organic materials are present in the bauxite, some of the said material is found in the form of sodium salts of various organic acids which are converted, at least partially, into sodium oxalate and carbonate. Finally, the circulating solutions are charged with sodium carbonate resulting mainly from the attack on the constituents of the mineral. Moreover, the attacking agents introduce their own impurities, and in particular certain industrial caustic soda solutions contain sodium chloride which remains in solution at a high concentration.

The accumulation of these impurities in the circulating solution has serious disadvantages. In particular, they have an adverse effect on the rate of decomposition of the sodium aluminate as well as on the physical and chemical properties of the aluminum hydroxide produced.

Various processes are known for removing some of these impurities for example by extracting them by superconcentration and causticization with lime after redissolving or roasting at high temperature, or by direct causticization at various points in the circuit.

These removal processes enable amounts corresponding to the amounts introduced to be extracted, but while maintaining an unfavorable level for each of these impurities in the solutions in circulation. In particular, on account of the concentration of carbonate which is generally reached, the amount of chlorine in the circulating solutions should be high so that this anion is removed by substitution on the silicoaluminates precipitated during the attack, but a high level of chlorine is unfavorable.

A first object of the process according to the invention is to maintain the level of sodium carbonate in the circulating solutions at a low value, which will enable the chlorine ion concentration in these solutions to be kept at a low value.

A second object of this process is to remove the sodium salts of organic acids, in particular sodium oxalate, as well as sodium carbonate which are produced in the cycle from organic acid possibly present in the mineral and dissolved as sodium salts during the attack.

Another object of the process according to the invention is to remove completely the elements sulfur, phosphorous and vanadium which when they are present in the mineral or starting materials, may have been dissolved during the attack.

Other objects of the process are to limit as far as possible the consumption of the chemical agent used to remove the undesirable impurities, and the amount of sludge or residues which are discarded.

The applicants have found that the low solubility of barium salts of the undesirable impurities, in particular in the form of carbonate, oxalate, phosphate, vanadate and sulfate, can be profitably utilized in order to extract at least one of the undesirable elements in an amount corresponding at least to the amounts derived from the starting materials, in the form of precipitates which can be easily separated from the starting solutions from which they are formed and do not carry down large amounts of the compounds sodium hydroxide or sodium aluminate, which are the valuable components of these solutions.

In its simplest embodiment, suitable when it is desired to remove only sodium carbonate, the process according to the invention consists of withdrawing at any point of the Bayer cycle an amount of sodium aluminate solution containing at least the amount of sodium carbonate it is desired to remove, adding to this withdrawn solution a recycled amount of a barium compound as will be explained hereinafter and less than the amount which would cause the total precipitation of the contained sodium carbonate, separating the precipitate formed as well as a solution of reduced sodium carbonate concentration which is reintroduced into the Bayer cycle, and finally calcining the precipitate optionally after addition of alumina, which will enable carbon to be removed in the form of $CO_2$, and recycling the barium compound formed by the calcination.

If the mineral contains organic acids which are dissolved during the attack and decompose, at least partially, with the formation of sodium oxalate and sodium carbonate, then a part of the calcined material containing an amount of barium greater than the amount corresponding to the oxalate and carbonate to be removed is, according to the invention, withdrawn and added to a soda solution withdrawn at a point in the cycle where the oxalate concentration is high; the precipitate formed is recycled to the calcination, while the purified solution containing the excess of barium is recycled for the treatment of a new fraction of sodium aluminate solution. The most suitable solution as solution charged with oxalate consists of the wash waters of the trihydrate produced.

According to a complementary, non-essential provision of the process of the invention, the calcined material is first of all leached, which leaves a residue consisting essentially of barium sulfate, vanadate and phosphate produced by the precipitation of these elements at the same time as that of the barium carbonate when the concentration of sodium carbonate in the cycle is kept at a low value in accordance with the process. The solution separated from this precipitate may be fractionated as has already been mentioned for the calcined material, one part being recycled to the treatment of a new fraction of sodium aluminate solution, and the other part being used for the precipitation of barium oxalate.

In another additional provision, a barium compound may be crystallized from this solution and the crystals and a solution may be separated, the latter being recycled for the leaching of the calcined material and the crystals being fractionated as has already been mentioned for the calcined material.

When operating in accordance with the invention, the solution treated to remove most of the carbonate and possibly most of the sulfur, phosphorous and vanadium, is different from the solution treated to remove the organic sodium salts, in particular the oxalate.

The alkaline sodium aluminate solution to be purified may be withdrawn at any point of the Bayer cycle after separation of the red mud. Thus, for example, the overflow liquors from the red mud washing plants, the liquor decanted or filtered before decomposition, the liquor after hydrolysis, and the reconcentrated liquor may be withdrawn. The withdrawal may involve only a part of the solution at the withdrawl point, and it is sufficient that the amount withdrawn is such that the precipitates formed contain amounts of each of the impurities which constitute them at least equal to the amounts of the same impurities dissolved during the attack.

The solution having a reduced sodium carbonate concentration and possibly a reduced concentration of sulfur, phosphorous and/or vanadium, may be reintroduced close to the point of withdrawal or at some other point in the cycle situated downstream of the withdrawal point in the Bayer cycle.

The barium compound recycled for the purpose of treating the aluminate solution may be barium oxide or hydroxide or an anhydrous or hydrated barium aluminate, and these compounds may be completely dissolved and reintroduced in the form of a solution, or reintroduced in solid form. This compound is in the form of oxide or hydroxide if the calcination was carried out without adding alumina, and is in the form of aluminate if alumina is present in sufficient amount during the calcination.

As has already been said, the amount of barium compound added is less than the amount which would cause the total precipitation of the carbonate and, possibly, of the sulfate, phosphate, and vanadate, in order to avoid the presence of barium dissolved in the purified aluminate solution.

If it is desired to remove the phosphate, sulfate and vanadate in the cycle according to the invention, the residual concentration of carbonate in the impoverished solution should be as low as 1.5 to 5 g/l of carbonated $Na_2O$.

The calcination is carried out as a temperature of 1400°–1500° C in the absence of alumina, and at a lower temperature such as 1000°–1100° C if alumina is added in the form of anhydrous oxide or natural or synthetic hydrated oxides. The barium compounds obtained for the purpose of being recycled are barium oxide in the absence of alumina, and barium aluminate in the presence of alumina.

If organic substances are present in the cycle and it is desired to remove them, a part of the calcined material or a product derived therefrom by lixiviation or leaching is used for this purpose, as has already been mentioned. The size of this portion is determined by the amount of organic salts, principally oxalate, and carbonate present in the solution withdrawn for the purpose of this removal. An excess of barium compound with respect to the impurities to be precipitated will be used; the recycled solution will thus contain dissolved barium.

As has been mentioned, the calcined material may be leached, which will enable a precipitate of barium sulfate, phosphate and vanadate to be separated when there is a solution containing them, and a solution containing barium in the dissolved state in the form of barium hydroxide or barium aluminate to be separated. In the case of a solution of aluminate, this is maintained having a slight soda content preferably 2 to 20 g/l of non-carbonated $Na_2O$.

This solution may be fractionated like the calcined material, one part being recycled in order to treat the solution of aluminate and the other part serving for the removal of the oxalate.

The solution may also be treated at E in order to extract therefrom the barium compound in the form of a precipitate. The separated solution is then recycled for the lixiviation of the calcined material. The precipitate may be fractionated in the same way as the calcined material or the solution resulting from the lixiviation of the latter.

In the case where the barium is in the form of hydroxide, it may be extracted by cooling the solution. In the case where it is in the form of aluminate of formula $Al_2O_4Ba \cdot 2H_2O$, the solution is heated in order to accelerate its precipitation.

The accompanying figure is a diagrammatic representation showing in full lines the circuit used when it is desired to remove only sodium carbonate, and in dotted lines the circuit used to remove not only carbonate, but also the oxalate and carbonate produced by the degradation of the organic acids present in the mineral.

When only carbonate is to be removed, the solution to be purified, $L_e$, is introduced via 1 at A, where barium compound recycled via 14 is added. The precipitate $S_1$ is separated from the purified liquor $L_1$, which is reintroduced via 2 into the Bayer cycle. The precipitate $S_1$, possibly after the addition of alumina via 3 at B, is calcined at C; carbon dioxide is removed via 4. The calcined material, which constitutes the barium source for the treatment of a new fraction of solution $L_e$, is recycled via 13 and 14.

If it is desired to remove oxalate, the calcined material is fractionated, the amount necessary for this removal being withdrawn via 15 in order to be introduced into F, and the remainder being directly recycled via 13 as previously. A solution carrying oxalate which has previously served to scrub the aluminum hydrate of the Bayer cycle is introduced into F via 9. The precipitate $S_4$ is formed, consisting mainly of barium oxalate and carbonate which is brought to B in order to be mixed with $S_1$ and calcined. The remaining solution $L_4$ is recycled to A via 10 and constitutes together with the other fraction of the calcined material recycled via 13, the barium compound used for the purification of a new fraction of solution $L_e$.

It should be noted that the barium compound recycling operations carried out according to the invention effect the desired removal of the carbonate and oxalate without consuming barium.

As has already been mentioned, the calcined material may be leached in whole or in part at D. If at least one of the elements sulfur, vanadium and phosphorous has been dissolved during the attack and then precipitated at A, a precipitate $S_2$ is formed consisting of barium sulfate, vanadate and/or phosphate, together with a solution $L_2$ mainly charged with barium. The precipitate $S_2$ is removed via 5. The solution $L_2$ may be fractionated as has been mentioned for the calcined material, a sufficient amount being used at F to remove oxalate and the remainder being direction via 16 and 14 for the treatment of a new fraction of solution $L_e$. In order to compensate for the barium removed at 5, barium is reintroduced, for example at B, at D, or into the solution $L_2$.

If the calcined material is completely soluble, the solution obtained may be fractionated like the calcined material, the part necessary for the removal of the oxalate being directed via 17 to F and the remainder being recycled via 18 and 14 to A.

$L_2$ may also be treated in order to extract therefrom the barium compound present in the form of barium hydroxide or barium aluminate. A liquor $L_3$ is formed which is recycled via 6 to D for the lixiviation of the calcined material; a precipitate $S_3$ is also formed. The precipitate $S_3$ may be fractionated like the calcined material of the solution $L_2$, the portion necessary for the removal of the oxalate being directed via 8 to F and the solid being recycled via 7 and 14 to A.

It can be seen that the process according to the invention enables amounts of phosphorous, sulfur, vanadium, carbonate and organic products which are sufficient to compensate for the amounts dissolved during the attack, to be removed by selecting the proportion of the solutions which are treated. The consumption of reactant is limited to the consumption of barium corresponding to the sulfur, phosphorous and vanadium removed. The removal of carbonate and organic salts does not give rise to any consumption of reactant, in particular of barium compound, or consumption of alumina or sodium hydroxide.

The process according to the invention is also remarkable for the ease with which it can be adapted to different minerals. This is important since if sodium carbonate is generally present in the solution resulting from the attack, the other organic acid impurities and compounds of sulfur, vanadium and phosphorous are not always present in the minerals or dissolved during the attack. The compounds of sulfur, vanadium and phosphorous may also be removed at other points in the Bayer cycle in accordance with known processes, and their removal in the cycle according to the present invention has the advantage that it requires, as an operation, only a solid-liquid separation.

The following examples, in which the amounts given refer to a ton of aluminum produced, illustrate some embodiments of the invention.

EXAMPLE 1

3.9 $m^3$ of liquor per ton of aluminum produced, i.e. 30% of the solution circulating at this point, were withdrawn from the Bayer cycle after the hydrolysis of the aluminate. The liquor thus withdrawn contained, in kg:

| | |
|---|---|
| non-carbonated $Na_2O$ | 624 |
| carbonated $Na_2O$ | 19 |
| $Al_2O_3$ | 312 |
| organic C | 13.1 |
| $P_2O_5$ | 0.62 |
| $V_2O_5$ | 0.56 |
| $SO_3$ | 2.9 |

This solution was mixed at A with a solution resulting from the treatment of 1 $m^3$ of the hydrate wash waters which contained, in kg:

| | |
|---|---|
| BaO | 8 |
| non-carbonated $Na_2O$ | 42 |
| carbonated $Na_2O$ | 0 |
| organic C | 0.9 |
| (of which oxalic C is | 0.1) |
| $Al_2O_3$ | 31 | and with 53.4 kg of hydrated barium aluminate crystals, $BaAl_2O_4.2H_2O$. This solution and these crystals consisted of recycled products resulting from the process according to the invention.

At the outlet of A there were separated 46kg of a precipitate $S_1$ and a solution $L_1$ having a reduced concentration of phosphorous, vanadium and sulfur and containing only 5.1 kg of carbonated $Na_2O$. This solution was returned to the Bayer cycle via 2, downstream of the withdrawal point.

11.6 kg of a precipitate $S_4$ consisting essentially of barium carbonate and organic barium salts, and 30.5 kg of $Al_2O_3$ introduced via 11, were added at B to the precipitate $S_1$.

This mixture was calcined at C at about 1050° C, 14.5 kg of $CO_2$ being evoked via 4.

The calcined product was lixiviated at D with 1.6 $m^3$ of a recycled solution $L_3$ containing, in kg:

| | |
|---|---|
| BaO | 24 |
| $Al_2O_3$ | 16 |
| $Na_2O$ | 8 | the formation of which will be described in detail hereinafter.

The resulting liquor $L_2$ and a residue $S_2$ were separated, the latter containing in kg:

| | |
|---|---|
| $BaSO_4$ | 0.12 |
| $Ba_3(PO_4)_2$ | 0.17 |
| $Ba_3(VO_4)_2$ | 0.27 | which was removed via 5.

The liquor $L_2$ was heated at E to 95° C, which resulted in the precipitation of crystals $S_3$ of $BaAl_2O_4.2H_2O$.

After separation, 1.6 $m^3$ of recycled liquor $L_3$ and 82.5 kg of these crystals $S_3$ were obtained.

29.1 kg of these crystals were mixed at F with 1 $m^3$ of hydrate wash water containing, in kg:

| | |
|---|---|
| non-carbonated $Na_2O$ | 38 |
| carbonated $Na_2O$ | 1.15 |
| organic C | 1.6 |
| (of which oxalic C is | 0.8) |
| $Al_2O_3$ | 19 |

There are thus obtained 11.6 kg of a precipitate $S_4$ containing 30% of $BaCO_3$ and 60% of $BaC_2O_4$ or other Ba salts of organic acids, and 1 $m^3$ of a solution $L_4$ which was recycled via 10 to A. The precipitate $S_4$ was recycled to B in order to be calcined.

The remainder of the crystals $S_3$, i.e. 53.4 kg, was recycled directly to A.

Summarizing, an amount of $CO_2$ was removed via 4 which corresponding to 25.6 kg of $Na_2CO_3$ (15 kg expressed as carbonated $Na_2O$) and to 3.9 kg of sodium salts of organic acids, expressed as $Na_2C_2O_4$ (0.7 kg expressed as C).

Furthermore, 0.12 kg of $BaSO_4$, 0.17 kg of $Ba_3(PO_4)_2$ and 0.27 kg of $Ba_3(VO_4)_2$ were removed via 5.

EXAMPLE 2

3.9 $m^3$ of liquor per ton of alumina produced were withdrawn after hydrolysis from a Bayer cycle, i.e. 30% of the solution circulating at this point. The amount withdrawn contained, in kg:

| | |
|---|---|
| non-carbonated $Na_2O$ | 624 |
| carbonated $Na_2O$ | 37.4 |
| $Al_2O_3$ | 312 |
| organic C | 13.1 |
| $P_2O_5$ | 0.62 |
| $V_2O_5$ | 0.56 |

-continued

| | |
|---|---|
| $SO_3$ | 2.9 |

This solution was mixed at A with a solution resulting from the treatment of 1 m³ of the hydrate wash waters, as will be described hereinafter, and which contained in kg per ton of alumina produced:

| | |
|---|---|
| BaO | 8 |
| non-carbonated $Na_2O$ | 42 |
| carbonated $Na_2O$ | 0 |
| organic C | 0.9 |
| (of which oxalic C is | 0.1) |
| $Al_2O_3$ | 31 | and with 43.0 kg of calcined barium aluminate. This solution and this solid were withdrawn from the specific cycle of the process according to the invention.

44 kg of a precipitate $S_1$ and a solution $L_1$ containing not more than 24.7 kg of carbonated $Na_2O$ were separated at the outlet A, the said solution being reintroduced via 2 into the Bayer cycle.

16.3 kg of a precipitate $S_4$ consisting essentially of barium carbonate and oxalate, and 30.5 kg of $Al_2O_3$ were added at B to the precipitate $S_1$.

This mixture was calcined at C at about 1050° C, 14.5 kg of $CO_2$ being liberated via 4. 73.5 kg of a calcined residue were thus obtained, consisting essentially of anhydrous barium aluminate $BaAl_2O_4$. This calcined material was fractionated, 30 kg of the anhydrous calcined material being mixed at F with 1 m³ of hydrate wash waters containing, in kg:

| | |
|---|---|
| non-carbonated $Na_2O$ | 38 |
| carbonated $Na_2O$ | 2.3 |
| organic C | 1.6 |
| (of which oxalic C is | 0.8) |
| $Al_2O_3$ | 19 |

16.3 kg of a precipitate $S_4$ containing 59% of $BaCO_3$ and 41% of $BaC_2O_4$ or other Ba salts of organic acids, and 1 m³ of a solution $L_4$ were thus obtained, the latter being recycled via 10 to A. The precipitate $S_4$ was recycled to B in order to be calcined.

Summarizing, an amount of $CO_2$ corresponding to 25.6 kg of $Na_2CO_3$ (15 kg expressed as carbonated $Na_2O$) and to 3.9 kg of sodium salts of organic acids, expressed as $Na_2C_2O_4$ (0.7 kg expressed as C) was removed via 4.

Example 3

6.5 m³ of liquor per ton of alumina produced, i.e. 50% of the solution circulating at this point, were withdrawn after hydrolysis from a Bayer cycle. It contained, kg:

| | |
|---|---|
| non-carbonated $Na_2O$ | 1040 |
| carbonated $Na_2O$ | 52 |
| $Al_2O_3$ | 520 |
| organic C | 21 |
| $P_2O_5$ | 1 |
| $V_2O_5$ | 0.9 |

This solution was mixed at A with 62 kg of calcined barium aluminate, $BaAl_2O_4$, withdrawn from the specific cycle of the process according to the invention.

48 kg of a precipitate $S_1$ and a solution $L_1$ containing not more than 37 kg of carbonated $Na_2O$ were separated at the outlet of A, solution being reintroduced via 2 into the Bayer cycle.

25 kg of $Al_2O_3$ were added at B to the precipitate $S_1$.

This mixture was calcined at C at about 1050° C, with the liberation of 10.5 kg of $CO_2$. 62 kg of a calcined residue consisting essentially of $BaAl_2O_4$ were thus obtained, which was recycled at A.

Summarizing, an amount of $CO_2$ corresponding to 25.6 kg of $Na_2CO_3$ (15 kg expressed as carbonated $Na_2O$) was removed via 4.

EXAMPLE 4

6.5 m³ of liquor per ton of alumina produced were withdrawn after hydrolysis from a Bayer cycle. It contained in kg:

| | |
|---|---|
| non-carbonated $Na_2O$ | 1040 |
| carbonated $Na_2O$ | 52 |
| $Al_2O_3$ | 520 |
| organic C | 21 |
| $P_2O_5$ | 1 |
| $V_2O_5$ | 0.9 |

This solution is mixed at A with 45.5 kg of calcined barium aluminate $Ba_3Al_2O_6$ withdrawn from the specific barium recovery and regeneration cycle of the process according to the invention.

48.3 kg of a precipitate $S_1$ and a solution $L_1$ containing not more than 37.4 kg of carbonated $Na_2O$ and 20.5 kg of organic C were separated at the outlet of A, the solution being reintroduced via 2 into the Bayer cycle.

8.3 kg of $Al_2O_3$ were added at B to the precipitate $S_1$.

This mixture was calcined at C at about 1100° C. 12.2 kg of $CO_2$ were liberated. 45.5 kg of a calcined residue consisting essentially of $Ba_3Al_2O_6$ were thus obtained, which was recycled at A.

Thus, an amount of $CO_2$ corresponding to 25 kg of $Na_2CO_3$ (14.6 kg expressed as carbonated $Na_2O$) and 0.5 kg of organic C were removed via 4.

Within the terms of the appended claims many variations and modifications of the procedure described may be practiced without departure from the essence of our invention.

We claim:

1. Process of purifying a red mud-free alkaline solution of sodium aluminate obtained from the Bayer cycle process of treating bauxite with alkali to produce hydrated alumina, for the purpose of holding down the sodium carbonate content of solution in circulation in the Bayer cycle by removing impurities in the form of barium carbonate and barium oxalate comprising withdrawing at any point in the Bayer cycle, alkaline sodium aluminate solution containing an amount of sodium carbonate at least equal to the amount which was in solution during the Bayer cycle, adding a recycled quantity of a barium aluminate compound which is less than the quantity corresponding to the complete precipitation of the sodium carbonate in the form of barium carbonate, separating the precipitated barium carbonate from the sodium aluminate solution, now of reduced sodium carbonate concentration, reintroducing the latter sodium aluminate solution into the Bayer cycle, calcining the barium carbonate precipitate in the presence of added alumina, thereby removing carbon dioxide and obtaining a calcined material of essentially barium aluminate, separating the calcinate of barium aluminate into two fractions, mixing a first fraction with a solution of sodium aluminate containing sodium oxalate, being hydrate wash water previously served to scrub the aluminum hydrate of the Bayer cycle and taken therefrom, this fraction containing an amount of barium greater than the amount corresponding to the carbonate and oxalate to be removed, thus forming a precipitate and a solution with the excess barium dissolved therein, separating the precipitate and adding the same to the barium carbonate being calcined, mixing the separated solution having excess barium therein with the other fraction and recycling the compound resulting from the calcination mixture in the Bayer cycle in order to treat the alkaline sodium aluminate solution which is removed at any point in the Bayer cycle, whereby consumption of the barium aluminate compound reactant is avoided.

2. Process according to claim 1, in which the solution charged with barium aluminate derived from the calcined material is heated in order to extract therefrom this aluminate in the form of crystals of $BaAl_2O_4 \cdot 2H_2O$.

3. Process as in claim 1, wherein the barium aluminate calcinate is leached at least partially by a solution having a slight soda content of 2 to 20 g/l of non-carbonated $Na_2O$, separating a precipitate of barium sulfate, phosphate and vanadate, and recycling the barium aluminate solution for the treatment of the sodium aluminate from the Bayer cycle.

* * * * *